United States Patent [19]

O'Lenick, Jr.; Anthony J.

[11] Patent Number: 5,460,856
[45] Date of Patent: Oct. 24, 1995

[54] PROCESSES UTILIZING MIXED EMULSIONS IN THE PRINTING INDUSTRY

[75] Inventor: Anthony J. O'Lenick, Jr., Lilburn, Ga.

[73] Assignee: Siltech Inc., Norcross, Ga.

[21] Appl. No.: 385,661

[22] Filed: Feb. 8, 1995

[51] Int. Cl.$^6$ .................................................. B05D 1/02
[52] U.S. Cl. ........................ 427/421; 427/258; 427/288; 427/391; 427/407.1; 427/411; 427/428
[58] Field of Search ................................. 427/421, 428, 427/391, 407.1, 411, 258, 288

[56] References Cited

U.S. PATENT DOCUMENTS

| | | | |
|---|---|---|---|
| 4,530,874 | 7/1985 | Hendrix et al. | 427/258 |
| 4,808,443 | 2/1989 | Minamoto et al. | 427/407.1 |
| 4,952,426 | 8/1990 | Guttag | 427/258 |
| 5,022,947 | 6/1991 | Hasegawa et al. | 427/258 |
| 5,035,946 | 7/1991 | Baker et al. | 427/258 |
| 5,368,891 | 11/1994 | Sagara et al. | 427/258 |

*Primary Examiner*—Shrive Beck
*Assistant Examiner*—David M. Maiorana

[57] ABSTRACT

The present invention relates to a process for the use of a novel emulsion composition in the printing industry. The composition when applied to printed substrates provides outstanding lubrication, antistatic and antismudge properties, as well as minimizes the occurrence of tears in the substrate. Additionally, the compositions of the present invention aid in the folding operation.

The compositions of the present invention are emulsions. These emulsions are applied to the substrate surface after the ink is applied. The emulsion breaks causing the deposition of a uniform coating of composition of the current invention.

The mixed emulsion composition contains one or more dimethylpolysiloxanes, mineral oil, a nonionic emulsification agent and water.

6 Claims, No Drawings

PROCESSES UTILIZING MIXED EMULSIONS IN THE PRINTING INDUSTRY

DESCRIPTION OF THE ART AND PRACTICES

Oil based inks have been and are currently used in lithographic printing, letterpress printing, etc. Oil based inks contain a resin, which undergoes polymerization. The initial time during which the polymerization occurs resulting in a semis solid ink is referred to as "setting". In ordinary oil-based inks, setting will usually require 15 to 30 minutes. Complete curing will usually require 3 to 10 hr. Thus, setting and drying of oil based inks requires a very long time. This impedes printing speed and adds significantly to the cost of printing. Since the substrate upon which the printing is done needs to be moved during the set and cure time, several problems can be encountered. These include (a) ink smudge; (b) static electricity build up and (c) paper tearing by the process of moving the paper through the high speed processing.

Several approaches have been taken to overcome these problems. In one approach, which is useful in sheet fed lithographic printing, a fine powder such as starch is sprayed on each printed surface right after printing. While providing some improvement in smudge resistance, the fine powder scatters into the air, posing an environmental problem. The fine powder also adheres to the printed surface reducing the gloss and other visual qualities of the printed matter.

In the web fed printing operation the ink is applied onto a web. Therefore, heat set type inks have been used widely. These inks are first dried by evaporation of the solvents in the inks when the printed surface is heated around 130° C. The heating is conducted in a drier, an infrared heater, or the like. This drying method caused various problems including (a) high energy usage (b) solvent vapor discharge leading to air pollution and offensive odor and (c) reduction in printed matter gloss.

In addition, processes using radiation curable inks have additional problems including (a) the need for a special printing plate, a special blanket and a special ink cleaner. These are required because the radiation curing inks are composed of different binders than conventional ink and (b) the ink used is not only expensive but also poor in storability, stability and workability and therefore these inks are not widely used.

There has recently been developed a printing method in which a film of an aqueous coating agent is formed on a wet surface right after printing to improve the above mentioned problems associated with drying of printing ink and also to impart various desired properties such as gloss to the surface. The oil based inks are coated with a conventional aqueous coating agent, which is a polydimethylsiloxane emulsion. The product is applied while the ink is still in the wet state, resulting in the dissipation of static electricity, which allows for faster printing speeds.

The silicone emulsion has no effect on the setting and / or drying of the oil-based ink. Unacceptable smudging of the uncured ink frequently occurs. The tendency to smudge is related to the rub resistance of the uncured ink. Fully cured ink does not smudge. Smudge resistance is required for high quality printed matter.

U.S. Pat. No. 4,808,443 issued Feb. 1989 to Minamoto teaches that a reactive aqueous system containing a resin, and a polyalkylene glycol dialkyl ether, will form a resinous over coating on both the paper and the ink. This allows one to physically manipulate the printed goods sooner after printing. The resin applied as an overcoat, cures more rapidly and into a harder polymer than does the ink. The key therefore to the Minamoto invention is the rapid resinous film forming properties of the composition. This is stressed in col. 4 line 15–25. In essence the protective resinous overcoat is applied to seal the ink to the paper. While this allows for one to speed up the printing process, the encapsulation and sealing of the ink and paper in a resinous coating can interfere with the ink's natural cure and actually be detrimental to the long term print quality. The encapsulating resin is less flexible than the ink, and consequently less rub resistant than the fully cured ink. The process by which the reactive resin overcoat composition is polymerized is free radical in nature and consequently discoloration of the paper can be a problem.

Quite the contrary to the teachings of Minamoto, which suggests coating the ink, we have surprisingly found that the application of a mineral oil and silicone in a stable mixed emulsion, will not only provide the antistat properties, but also will provide lubrication to the ink resin and paper fiber. This lubrication minimizes smudging and tearing as well as providing antistatic properties. The solubility of the ink in the mineral oil is a major reason why the mineral oil lubricates the ink.

THE INVENTION

The present invention relates to a novel mixed silicone, mineral oil emulsion composition and process for it's use, in the printing industry. The composition when applied to printed substrates provides outstanding lubrication, antistatic and antismudge properties, as well as minimizes the occurrence of tears in the substrate. Additionally, the compositions of the present invention aid in the folding operation.

The compositions of the present invention are stable emulsions. These emulsions are applied to the printed substrate's surface after the ink is applied and before it is set or cured.

The composition contains (a) a silicone polymer (dimethylopolysiloxane) having a viscosity of between 100 and 1,000 cst; (b) mineral oil; and (c) an emulsification agent or agents which facilitates the production of a stable emulsion.

An additional aspect of the invention is a process for treating printed goods which comprises contacting the goods with an effective conditioning amount of a mixed emulsion composition which consists of (a) 5–50% of dimethylpolysiloxane (b) 45–5% of a mineral oil (c) 1–10% of a nonionic emulsification agent and (d) water.

We have unexpectedly found that the both silicone and mineral oil need to be present in the compounds of the present invention in order for the compound to work in the printing application. If a silicone free, mineral oil based product is used the spreadability on the roller will be adversely affected. The formulation may also include a quaternary compound for antistatic properties.

OBJECT OF THE INVENTION

One of the objects of the invention is to provide stable mixed silicone / mineral oil emulsion composition which when applied to printed substrates provides superior lubrication, antistatic and antismudge properties, as well as minimizes the occurrence of tears in the substrate.

An additional aspect of the invention is a process for treating printed goods which comprises contacting the goods with an effective conditioning amount of a mixed emulsion composition which consists of (a) 5–50% of dimethylpolysiloxane (b) 45–5% of a mineral oil (c) 1–10% of a nonionic emulsification agent and (d) water.

SUMMARY OF THE INVENTION

The compositions of the present invention are highly stable mixed emulsions, which provide superior lubrication, antistatic and antismudge properties, as well as minimizes the occurrence of tears in the substrate. This is achieved by incorporation into the emulsion of (a) a silicone polymer (dimethylopolysiloxane) having a viscosity of between 100 and 1,000 cst; (b) mineral oil; and (c) emulsification agents which facilitates the production of a stable emulsion.

DETAILED DESCRIPTION OF THE INVENTION

It has been surprisingly found that highly stable emulsions can be formulated which provide cost effective lubrication, antistatic and antismudge properties, as well as minimizes the occurrence of tears when applied to printed sheets.

The compositions of the present invention consist of;

(a) 50–5% of dimethylpolysiloxane

The compositions of the invention have at least one viscosity dimethylorganopolysiloxane fluid having a viscosity of between 100 and 1,000 cps. These fluids are also referred to as silicone fluids and are distinguished from silicone elastomers and resins. They are basically dimethylpolysiloxnane fluids, which are substantially linear in nature. The structure of the dimethylpolysiloxane fluid is shown by the following formula: t,100
wherein:

Me is methyl:

n is an integer ranging from 10 to 2000.

These dimethylpolysiloxane fluids are available as mixtures of polymers of varying chain length. It has been found for purposes of the invention that the viscosity of the silicone fluids is an important factor in the preparation of an effective printing emulsion. Silicone fluids can be used which have a viscosity range from 100 centipose (cps) up to about 1,000 cps. It is within this range that the antistatic properties are best.

We have also determined that surprisingly, in a preferred embodiment a mixture of two fluids, one having a low viscosity fluid ( 100 centipose (cps)), and the other a higher viscosity fluid (500–1,000 centipose (cps)) results in enhanced antistatic performance attributes. The dimethylpolysiloxane has some difficulty penetrating both the ink and the paper surface. It remains on or close to the surface of the polymer being treated and provides a protective surface barrier so that static electricity formed during the printing process is minimized. It also provides added gloss. A preferred embodiment is one wherein the polydimethylsiloxane is a blend of a polydimethylsiloxane having a viscosity of between 50–100 cps and a polydimethylsiloxane having a viscosity of between 500 and 1,000 cps.

We found that mineral oil is a critical additive for improved smudge resistance. It penetrates the ink and paper and serves as a lubricant, plasticizer and softener in the ink minimizing the tendency to smudge. It is exactly these properties which contribute the anti smudge properties. Simply, when you lubricate the ink, the polymer flexes and the smudge does not occur. If a silicone free, mineral oil based product is used the spreadability on the roller will be adversely affected. The formulation may also include a quaternary compound for antistatic properties.

This brings us to the second component of our emulsion;

(b) 5–50% of an mineral oil

Mineral oil is well known to those skilled in the art. It is derived from crude oil. It contains a mixture of napthenic compounds, paraffins, cycloparaffins, and hydrocarbons.

In refining the mineral oil the first step is the removal of low boiling components. The low boiling fraction includes gasoline, naptha, kerosene, and mineral spirits. These materials are not useful in the preparation of the compounds of the present invention, although the crude mineral oil from which they are removed is functional.

White oil is a grade of mineral oil which has been refined. It is a colorless, transparent liquid. White oil with a viscosity of below 172 cps at 100° F. is called light oil. Oil with a viscosity over 177 is termed heavy oil.

White oil is a preferred material for the preparation of the compositions of the present invention. This is because of the purity and lack of lower boiling fractions which become air borne in the process.

The use of mineral oil is a major factor in the effectiveness of the compositions of the present invention. As described above, the dimethyl polysiloxane has only minimal solubility in the ink used in the printing process. While the incorporation of a low molecular weight silicone fluid provides some added penetration of the ink, it is only when an mineral oil is incorporated that optimum performance is obtained. The silicone oil and the mineral oil are insoluble in each other, but when properly emulsified form a stable emulsion. The preferred concentration of mineral oil is between 45 and 5%.

Once it was determined that the polydimethylsiloxane together with the mineral oil in a Single emulsion provided the optimum composition for use in the printing process, the challenge of providing a stable emulsion remained. Mineral oil is not soluble in polydimethylsiloxane, and neither are soluble in water.

In a preferred embodiment the composition has ratio of mineral oil to silicone ranging from 1:10 to 10:1. In a more preferred embodiment composition the ratio of mineral oil to silicone ranges from 1:1 to 5:1.

The ideal emulsion for the printing application contains (a) antistat (polydimethylsiloixane component) (b) anti smudge / lubricant (mineral oil) (c) solvent (water). Since all are mutually immiscible, the emulsifier or emulsifier pair chosen becomes another major variable.

The preparation of a stable mixed emulsion requires not only the proper selection of emulsifiers but also the proper selection of the process used to make the emulsion and homogenization equipment.

(c) 1–10% of a nonionic emulsification agent

The emulsification agent facilitates the production of a stable emulsion. In short it allows for the oil soluble dimethylpolysiloxanes and the mineral oil to remain suspended in a milky white emulsion, until they can be applied to the surface of the paper.

Many types of emulsifiers can be used in the preparation of the compounds of this invention. The preferred materials are nonionic compounds which have an HLB of between 8 and 11.

HLB is the measure of the amount of water soluble component on an emulsification agent. Typically for nonionics it is calculated as
HLB=
(% water soluble component in the surface active agent) / 5

Therefore emulsification agents useful in the practice of this invention will have between 40 and 50% water soluble component present in the compound. Most commonly, a pair of emulsifiers are blended to get an HLB with a numerical average of 8 to 11. Emulsifier pairs generally result in a more stable emulsion.

In a preferred embodiment the composition contains a nonionic emulsifier which has a HLB ranging from 8 to 10.

Examples of emulsifiers which are useful are; t,160

Prior to the present invention, it was not understood that the mixed emulsions (ie. containing both mineral oil and silicone oils) with their different solubilities were highly effective when used in printing applications.

Emulsions of the present invention are applied to the printed goods before curing either with heat or VU light. The concentration of the emulsion when applied is between 10 and 60% with 35% being preferred.

EXAMPLES

General Procedure

To the specified amount of water is added the specified amount of surfactants under agitation. Mix well about 15 minutes. Slowly add the specified amount of the specified polydimethylsiloxane(s) under good agitation over a one hour period. Slowly add the specified amount of mineral oil over a one hour period. Mix one hour after all ingredients have been added. Homogenize in a Marin Gaulin Homogenizer at 6,000 psi. Allow to cool under agitation. The resulting emulsion is used as prepared.

Emulsions were prepared using the above procedure and the following formulations;

EXAMPLES 1–10 t,180

OP-5 is octylphenol having 5 moles of ethylene oxide added to it. t,190

EXAMPLES 11–20

Examples 1–10 are repeated, only this time they are homogenized at 2,000 psi rather than the 6,000 psi

APPLICATION RESULTS

Performance

The emulsions were evaluated for both antismudge and antistatic properties when applied to freshly printed paper using a web press. The emulsions are sprayed onto the printed matter at concentrations ranging form 10% to 60%. An alternate method of preparation is the use of a roller which contacts the paper. The roller is referred to as a kiss roller in the trade.

We evaluated antistatic properties as well as antismudge properties of the ink treated with our emulsion. We used a rating scale of 0–10 ( 0 poor — 10 excellent) The results are: t,210

As can be seen samples which include a mixed emulsion containing mineral oil and polydimethylsiloxane gave the best performance. Those materials prepared by using a high and low viscosity polydimethylsiloxane combination were best.

Emulsion Stability

The emulsions prepared above were subjected to a centrifuge test are 3,500 rpm for 1 hour. The emulsion stability was then checked, a failed emulsion would have split into layers. t,220

As can be seen the use of a high pressure homogenizer 5,000 psi and above gave good emulsion stability. Emulsion stability is considered key to the preparation of successful products.

What is claimed:

1. A process for providing lubrication, antistatic and antismudge properties to printed paper which comprises spraying onto the paper on which ink has been applied an effective lubricating, antistatic and antismudge concentration of a mixed emulsion composition which consists of:
   (a) 5–50% by weight of total composition of dimethylpolysiloxane
   (b) 45–5% by weight of total composition of mineral oil
   (c) 1–10% by weight of total composition of a nonionic emulsification agent
   and
   (d) water.

2. A process of claim 1 wherein the emulsion concentration ranges from between 10 and 60% by weight of total composition.

3. A process of claim 1 wherein the emulsion concentration is 35% by weight of total composition.

4. A process for providing lubrication, antistatic and antismudge properties to printed paper which comprises applying onto the paper on which ink has been applied an effective lubricating, antistatic and antismudge concentration of a mixed emulsion composition which consists of:
   (a) 5–50% by weight of total composition of dimethylpolysiloxane
   (b) 45–5% by weight of total composition of a mineral oil
   (c) 1–10% by weight of total composition of a nonionic emulsification agent
   and
   (d) water said application is made by using a roller.

5. A process of claim 4 wherein the emulsion concentration ranges from between 10 and 60% by weight of total composition.

6. A process of claim 4 wherein the emulsion concentration is 35% by weight of total composition .

\* \* \* \* \*

UNITED STATES PATENT AND TRADEMARK OFFICE
CERTIFICATE OF CORRECTION

PATENT NO. : 5,460,856
DATED : October 24, 1995
INVENTOR(S) : Anthony J. O'Lenick, Jr.

It is certified that error appears in the above-indentified patent and that said Letters Patent is hereby corrected as shown below:

on Col 3 line 38, delete "t,100"

and insert therefore --

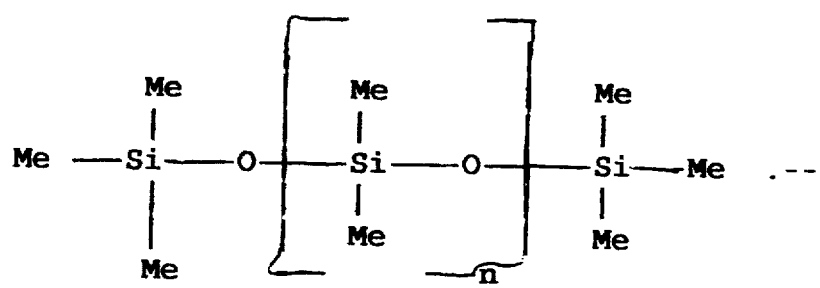

. --

UNITED STATES PATENT AND TRADEMARK OFFICE
CERTIFICATE OF CORRECTION

PATENT NO. : 5,460,856
DATED : October 24, 1995
INVENTOR(S) : Anthony J. O'Lenick, Jr.

It is certified that error appears in the above-indentified patent and that said Letters Patent is hereby corrected as shown below:

Col 5 line 13  delete "t, 160" and insert therefore --

| Trade name | HLB | Description |
| --- | --- | --- |
| Neodol 23-3 | 8 | $C_{12}H_{24}O-(CH_2CH_2-O)_3H$<br>3 mole ethoxylate |
| Alkasurf DA-3 | 9 | $C_{10}H_{22}O-(CH_2CH_2-O)_3H$<br>3 mole ethoxylate |
| Alkasurf NP-5 | 10 | Nonylphenol 5 mole ethoxylate |
| 50/50 blend of Tergitol 15-S-3 and Tergitol 15-S-5 | 9.5 | Secondary Alcohol ethoxylates having three and five moles EO |

NEODOL is a trademark of Shell Chemical
ALKASURF is a trademark of Alkaril Chemicals Inc.
TERGITOL is a trademark of Union Carbide Chemical and
(d) water                    --

UNITED STATES PATENT AND TRADEMARK OFFICE
CERTIFICATE OF CORRECTION

PATENT NO. : 5,460,856
DATED : October 24, 1995
INVENTOR(S) : Anthony J. O'Lenick, Jr.

It is certified that error appears in the above-indentified patent and that said Letters Patent is hereby corrected as shown below:

col 5 line 38 delete " t,180" and insert therefore --

| Example # | Dimethylpoly siloxane Type / Grams | Mineral oil Type/ Grams | Emulsifier Type/ Grams | Water Grams |
|---|---|---|---|---|
| 1 | 350 cps<br>600 grams | none<br>0 grams | OP-5<br>40 grams | --<br>360 gram |
| 2 | none<br>0 grams | mineral oil<br>600 Grams | OP-5<br>40 grams | --<br>360 gram |
| 3 | 350 cps.<br>50 grams | mineral oil<br>550 grams | OP-5<br>40 grams | --<br>360 gram |
| 4 | 350 cps.<br>300 grams | mineral oil<br>300 grams | OP-5<br>40 grams | --<br>360 gram |

UNITED STATES PATENT AND TRADEMARK OFFICE
CERTIFICATE OF CORRECTION

PATENT NO. : 5,460,856
DATED : October 24, 1995
INVENTOR(S) : Anthony J. O'Lenick, Jr.

It is certified that error appears in the above-indentified patent and that said Letters Patent is hereby corrected as shown below:

| | | | | | |
|---|---|---|---|---|---|
| 5 | 100 cps.<br>50 grams | mineral oil<br>550 grams | OP-5<br>40 gram | ---<br>360 gram | — |
| 6 | 100 cps.<br>300 grams | mineral oil<br>300 grams | OP-5<br>40 grams | --<br>360 gram | |
| 7 | 1000 cps.<br>300 grams | mineral oil<br>300 grams | OP-5<br>40 grams | --<br>360 gram | -- |

UNITED STATES PATENT AND TRADEMARK OFFICE
CERTIFICATE OF CORRECTION

PATENT NO. : 5,460,856
DATED : October 24, 1995
INVENTOR(S) : Anthony J. O'Lenick, Jr.

It is certified that error appears in the above-indentified patent and that said Letters Patent is hereby corrected as shown below:

Col 5 line 41 delete " t 190" and insert therefore --

| Example # | Dimethylpolysiloxane Type / Grams | Mineral oil Type / Grams | Emulsifier Type / Grams | Water Grams |
|---|---|---|---|---|
| 8 | 100/1000 cps. 150/150 grams | mineral oil 300 grams | OP-5 40 grams | --- 360 gram |
| 9 | 100/1000 cps. 285/285 grams | mineral oil 30 grams | OP-5 40 grams | --- 360 gram |
| 10 | 100/1000 cps. 15/15 grams | mineral oil 570 grams | OP-5 40 grams | --- 360 gram |

--

UNITED STATES PATENT AND TRADEMARK OFFICE
CERTIFICATE OF CORRECTION

PATENT NO. : 5,460,856
DATED : October 24, 1995
INVENTOR(S) : Anthony J. O'Lenick, Jr.

It is certified that error appears in the above-indentified patent and that said Letters Patent is hereby corrected as shown below:

Col 6 line 16 delete " t,220" and insert therefore --

| Example | Result | Example | Result |
|---------|--------|---------|--------|
| 1 | Pass | 6 | Fail (split) |
| 2 | Pass | 7 | Fail (split) |
| 3 | Pass | 8 | Fail (split) |
| 4 | Pass | 9 | Fail (split) |
| 5 | Pass | 10 | Fail (split) -- |

Signed and Sealed this

Thirteenth Day of February, 1996

Attest:

BRUCE LEHMAN

*Attesting Officer*   *Commissioner of Patents and Trademarks*